United States Patent [19]

Yamamoto et al.

[11] Patent Number: 4,532,446

[45] Date of Patent: Jul. 30, 1985

[54] SUBMERGED ELECTRIC MOTOR

[75] Inventors: Sakuei Yamamoto; Hiroshi Inao; Mitsuhiro Nishida; Matao Matsushita; Hidemi Komoda, all of Fukuoka, Japan

[73] Assignee: Mitsubishi Denki Kabushiki Kaisha, Tokyo, Japan

[21] Appl. No.: 486,543

[22] Filed: Apr. 19, 1983

[30] Foreign Application Priority Data

Apr. 19, 1982 [JP] Japan ................................. 57-66810

[51] Int. Cl.³ .............................................. H02K 5/10
[52] U.S. Cl. ........................................ 310/87; 310/42;
310/88; 310/89; 29/596; 220/3; 228/125;
228/184; 228/263.15
[58] Field of Search ....................... 310/87, 43, 89, 90,
310/42, 45, 85, 88, 258, 86, 44, 91; 220/3, DIG.
29; 29/596; 228/125, 184, 263.15

[56] References Cited

U.S. PATENT DOCUMENTS

| 2,698,911 | 1/1955 | Schaefer | 310/87 |
| 3,169,696 | 2/1965 | Warner | 310/89 |
| 3,270,224 | 8/1966 | Turk | 310/87 |
| 3,484,934 | 12/1969 | Wightman | 310/42 |
| 3,707,037 | 12/1972 | Gutris | 310/89 |
| 4,123,678 | 10/1978 | Jacoby | 310/42 |

Primary Examiner—R. Skudy
Attorney, Agent, or Firm—Wenderoth, Lind & Ponack

[57] ABSTRACT

A submerged electric motor comprises an outer hollow cylinder formed of a stainless steel, a stator iron core fixed on the inside of the outer cylinder, an annular end plate of a general structural rolled steel welded to an annular end portion formed between the outer hollow cylinder and an inner hollow cylinder coaxial with it by using a welding wire of the stainless steel. A combined deposit metal and fused portion underlaid with the end plate is machined to have an end surface flush with that of the end plate. A bracket is fixed to those end surfaces through bolts. Also a sheet-shaped soft sealing member may be interposed between the bracket and the machined end plate.

2 Claims, 7 Drawing Figures

SUBMERGED ELECTRIC MOTOR

BACKGROUND OF THE INVENTION

This invention relates to improvements in a welded structure in which an outer hollow cylinder of a corrosion resistant metal supporting a stator iron core is welded to an end plate of a base metal disposed at an end of the outer hollow cylinder.

Submersible electric motors to which the present invention is related usually comprises a pair of outer and inner hollow cylinders coaxial with each other, the stator iron core fixedly disposed in an annular space between the outer and inner hollow cylinders, the annular end plate fitted into one end of the annular space and welded to the two cylinders and the bracket fixed to the annular end plate through a plurality of bolts to rotatably support a rotary shaft having a rotor iron core fixed thereon.

In the electric motors as described above, the bracket may become corroded to permit external water to get into the interior of the inner cylinder. The intrusion of the external water affects the electric characteristics of the electric motors less because the interior of the inner cylinder is originally filled with a lubricating liquid. The intrusion of external water into the interior of the outer cylinder, however, results in the occurrence of faults in the electric motors because the stator coil disposed on the stator iron core is not constructed to be water-tight.

In conventional submersible electric motors, therefore, both the outer hollow cylinder and the annular end plate have been formed of a corrosion resistant metal such as a stainless steel, resulting in expensive electric motors. Alternately the end plate-might be formed of a base metal, for example, a general structural rolled steel and that portion thereof contacted by external water coated with an anticorrosive composition. In the latter case, the productivity has been poor because an anticorrosive process is required. Furthermore there have existed the disadvantages that an anticorrosive coating has a short lifetime and the desired anticorrosive effect can not be expected and so on.

Accordingly it is an object of the present invention to provide a new and improved submerged electric motor which is inexpensive and which has improved anticorrosion properties.

SUMMARY OF THE INVENTION

The present invention provides a submerged electric motor comprising an outer hollow cylinder formed of a corrosion resistant metal and having a stator iron core fixed on an inner surface thereof, an end plate formed of a base metal and disposed on an inner surface of an end portion of the outer hollow cylinder and a bracket disposed on an end surface of the end plate, the arrangement being that the end plate is welded to the end portion of the outer hollow cylinder by using a welding metal composed of the corrosion resistant metal and a combined deposit metal and a fused portion resulting from the welding is machined to have an end surface flush with that of the end plate to form an engaging surface on which the bracket is joined to the end plate.

In order to prevent the gap corrosion, a soft sealing member in the form of a sheet may be disposed on the engaging surface sandwiched between the bracket and the end plate.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
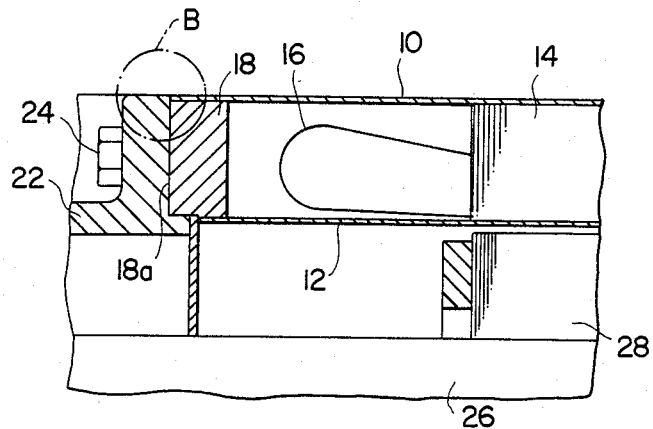
FIG. 1 is a fragmental longitudinal sectional view of one half of one embodiment of the submerged electric motor of the present invention with parts illustrated elevation.

Referring now to FIG. 1 of the drawing, there is illustrated one embodiment according to the submerged electric motor of the present invention. The arrangement illustrated comprises a pair of outer and inner hollow cylinders 10 and 12 respectively formed of a corrosion resistant metal such as a stainless steel identified, for example, by AIS2-206 or -304 and disposed to be coaxial with each other to form an annular space therebetween, a stator iron core 14 fixedly disposed within the annular space by having its outer and inner peripheries fixed to the inner and outer wall surfaces respectively of the outer and inner hollow cylinders 10 and 12 respectively, and a stator coil 16 disposed on the stator iron core 14. Then an annular end plate 18 is formed of a base metal, i.e. a metal subject to corrosion, such as a general structural rolled steel identified, for example, by ASTM Type A36 and fitted into an end of the annular space between the pair of the hollow cylinders 10 and 12.

Figure 3:
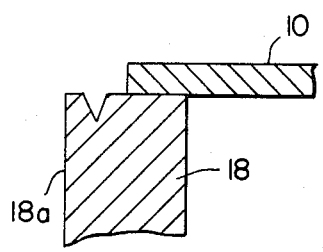
FIGS. 3 through 5 are fragmental longitudinal sectional views on enlarged scales of the successive steps of welding the annular end plate to one end of the outer hollow cylinder shown in FIG. 1.

As shown in FIG. 3, the annular end plate 18 is fitted into the end of the annular space before the end plate 18 is welded to the outer hollow cylinder 10, and the end plate 18 has an outer surface 18a facing outwardly of the end of cylinder 10 and a circumferential V-shaped groove disposed on the outer peripheral surface thereof adjacent to the outer surface 18a. The end plate 18 has about one half the thickness thereof, namely, the portion without the V-shaped groove, fitted into the annular space with the outer surface 18a perpendicular to the longitudinal axis of the annular space or the hollow cylinders.

Figure 4:
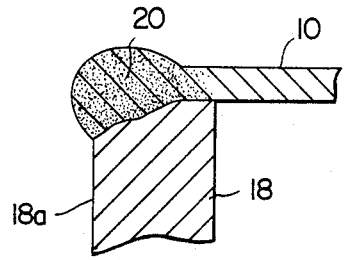

After the annular end plate 18 has been welded on the inner periphery to the inner hollow cylinder 12, a welding wire formed of a corrosion resistant metal similar to that for the hollow cylinders 10 and 12 is used to weld the end plate 18 to the end of the outer hollow cylinder 10 with a combined deposit metal and fused portion 20 underlaid with the end plate 18 as shown in FIG. 4 wherein there is illustrated the end plate 18 as welded to the outer hollow cylinder 10.

Figure 5:
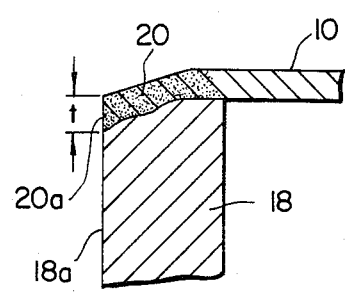

Then the combined deposit metal and fused portion 20 is machined to form an end surface 20a flush with the outer surface 18a of the end plate 18 and a tapered peripheral surface extending around the end plate as shown in FIG. 5. The combined deposit metal and fused portion 20 has a thickness of at least 1 mm on the end surface thereof for the purpose which will be apparent later.

Figure 2:
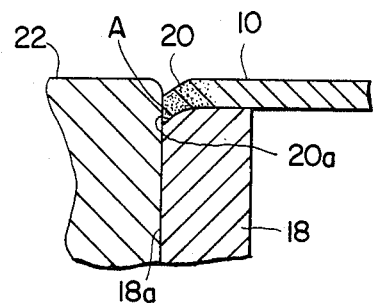
FIG. 2 is a longitudinal sectional view on an enlarged scale of one part designated by the reference character B in FIG. 1.

Then a bracket 22 is mounted against the annular end plate 18 thus machined through a plurality of bolts 24 one of which is shown in FIG. 1 only for purposes of illustration. At that time the bracket 22 is intimately contacted by both the end surfaces 20a and 18a of the combined deposit metal and fused portion 20 and the end plate 18 (see FIG. 2). As shown in FIG. 2, the bracket 22 has a surface A abutting against the end surface 20a of the deposit metal and fused portion 20 and completely covering end surface 20a.

The bracket 22 rotatably supports a rotary shaft 26 to which a rotor iron core 28 is fixed.

Figure 6:
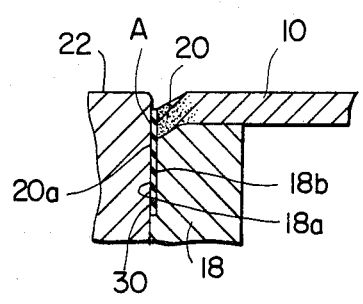
FIG. 6 is a view similar to FIG. 2 but illustrating a modification of the present invention.

FIG. 6 shows a modification of the present invention. The arrangement illustrated is different from that shown in FIG. 1 only in that in FIG. 6 an annular soft sealing member 30 in the form of a sheet is sandwiched between the outer peripheral portion of the end surface of the bracket 22 and that of the end plate 18 including the combined deposit mental and fused portion 20. To this end, the end plate 18 machined as described above is provided on end surface 20a and the outer peripheral portion of the outer surface 18a thereof with an annular recess 18b. Then the annular sealing member 30 is disposed in the recess 18b. The sheet-shaped sealing member is formed of a soft electrically insulating material, for example, a coating of a sealing paint or a sheet-shaped rubber packing.

Figure 7:
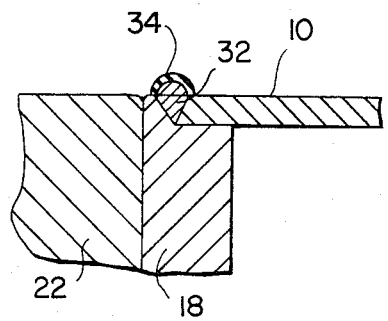
FIG. 7 is a view similar to FIG. 2 but illustrating a conventional submerged electric motor.

In order to prevent external water from intruding into the annular space between the outer and inner hollow cylinders 10 and 12 respectively to cause a fault in the stator coil 16, both the outer hollow cylinder 10 and the annular end plate 18 have been previously formed of a corrosion resistant metal such as described above resulting in an expensive device. Alternatively the end plate 18 might be formed of a base metal such as described above and welded to the outer hollow cylinder 10 formed of the corrosion resistant metal. Thereafter the exposed surface portion of the end plate and the resulting weld deposit have been coated with an anticorrosive composition. For example, FIG. 7 shows the latter case. In FIG. 7, an outer hollow cylinder 10 includes a bevelled end surface, and an annular end plate 18 formed of a base metal such as described above includes one end portion having an outside diameter substantially equal to that of the outer hollow cylinder 10 and continuing to a reduced diameter portion having an outside diameter sufficient to be just fitted into an annular end similar to that as described above through an annular bevelled surface plate 18 fitted into the annular space to form a V-shaped bevel therebetween. Then the end plate 18 is welded to the outer hollow cylinder with a deposit metal 32 disposed in the V-shaped bevel after which the deposit metal 32 is coated with an anticorrosive composition 34 along with the exposed surface portion of the end plate 18 and that portion of the outer cylinder 10 adjacent to the deposit metal 32. However the arrangement of FIG. 7 has had the disadvantages as described above.

It is, however, seen that, according to the present invention, the end plate of a base metal is welded to the outer hollow cylinder by using a welding wire of a corrosion resistant metal and the combined deposit metal and fused portion is machined to have an end surface flush with that of the end plate. Thus the combined deposit metal and fused portion ensures that the end plate is prevented from contacting external water. Thus a local cell is not formed through the external water resulting in an improvement in the anticorrosion properties of the end plate. In addition, the end plate can be formed of a cheap material such as a general structural rolled steel.

Furthermore the arrangement of FIG. 6 ensures that external water is prevented from intruding into the interior of the outer hollow cylinder because the soft sealing member is interposed between the bracket and the end plate.

While the present invention has been illustrated and described in conjunction with a few preferred embodiments thereof it is to be understood that numerous changes and modifications may be resorted to without departing from the spirit and scope of the present invention.

What is claimed is:

1. A submergible electric motor comprising:
    an outer hollow cylinder of a corrosion resistant metal and having an iron stator core fixed on the inner surface thereof;
    an end plate of a base metal and having the peripheral edge engaged with the inner surface of one end portion of said outer hollow cylinder and having an outer surface facing outwardly of the end of said hollow cylinder;
    a bracket mounted against the outer surface of said end plate; and
    a combined deposit metal and fused portion joining said end portion of said outer hollow cylinder and the peripheral edge of said end plate, said combined deposit metal and fused portion including the corrosion resistant metal as the deposit metal, said combined deposit metal and fused portion having an end surface flush with said outer surface of said end plate, said fused portion further having a peripheral surface extending around said end plate whereby the base metal of said end plate is isolated from water in which the motor is submergible by said combined deposit metal and fused portion and said bracket.

2. A submergible electric motor as claimed in claim 1 further comprising a sheet of soft sealing material disposed between bracket and said end plate at least over the end surface of said combined deposit metal and fused portion.

* * * * *